United States Patent
Wan et al.

(10) Patent No.: US 9,032,428 B2
(45) Date of Patent: May 12, 2015

(54) VALIDATION OF TV VIEWERSHIP UTILIZING METHODS, SYSTEMS AND COMPUTER CONTROL LOGIC

(71) Applicant: Intel Corporation, Santa Clara, CA (US)

(72) Inventors: Chieh-Yih Wan, Beaverton, OR (US); Mark D. Yarvis, Portland, OR (US); Sharad K. Garg, Portland, OR (US); Marcelino Ford Livene, Pasadena, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/656,881

(22) Filed: Oct. 22, 2012

(65) Prior Publication Data

US 2013/0283304 A1    Oct. 24, 2013

Related U.S. Application Data

(63) Continuation of application No. 12/924,237, filed on Sep. 23, 2010, now abandoned.

(51) Int. Cl.

| | |
|---|---|
| *H04H 60/32* | (2008.01) |
| *H04N 21/442* | (2011.01) |
| *H04H 60/45* | (2008.01) |
| *H04H 60/65* | (2008.01) |
| *H04N 21/258* | (2011.01) |
| *H04N 21/81* | (2011.01) |

(Continued)

(52) U.S. Cl.
CPC ......... *H04N 21/44204* (2013.01); *H04H 60/45* (2013.01); *H04H 60/65* (2013.01); *H04N 21/25891* (2013.01); *H04N 21/812* (2013.01); *H04N 21/44222* (2013.01); *H04N 21/4532* (2013.01); *H04N 21/6582* (2013.01)

(58) Field of Classification Search
USPC ....................................... 725/9–61
See application file for complete search history.

(56) References Cited

U.S. PATENT DOCUMENTS

| | | | |
|---|---|---|---|
| 5,801,747 | A | 9/1998 | Bedard |
| 6,177,931 | B1 | 1/2001 | Alexander |

(Continued)

FOREIGN PATENT DOCUMENTS

| | | |
|---|---|---|
| JP | 2005-167907 | 6/2005 |
| KR | 10-2002-0024645 | 4/2002 |
| KR | 10-2006-0122372 | 11/2006 |
| TW | 200937330 | 9/2009 |

OTHER PUBLICATIONS

International Search Report and Written Opinion received for PCT Patent Application No. PCT/US2009/068689, mailed on Aug. 26, 2010, 11 pages.

(Continued)

*Primary Examiner* — Yassin Alata
(74) *Attorney, Agent, or Firm* — Trop, Pruner & Hu, P.C.

(57) ABSTRACT

A method, system and computer control logic to provide personalization of a viewer's usage of an Internet TV platform. The method includes tracking a viewer's interactive usage pattern of the TV platform; generating viewer usage data based on the tracking; analyzing the viewer usage data on a substantially real-time basis; and personalizing the viewer's usage of the TV platform on a based on an analysis the viewer usage data.

18 Claims, 6 Drawing Sheets

(51) Int. Cl.
*H04N 21/45* (2011.01)
*H04N 21/658* (2011.01)

(56) References Cited

U.S. PATENT DOCUMENTS

| | | | |
|---|---|---|---|
| 7,363,151 B2 | 4/2008 | Nomura et al. | |
| 7,636,785 B2 | 12/2009 | Shahine et al. | |
| 2002/0078441 A1 | 6/2002 | Drake et al. | |
| 2003/0067554 A1 | 4/2003 | Klarfeld et al. | |
| 2003/0163817 A1 | 8/2003 | Han | |
| 2004/0111744 A1* | 6/2004 | Bae et al. | 725/38 |
| 2007/0146554 A1* | 6/2007 | Strickland et al. | 348/731 |
| 2008/0040221 A1* | 2/2008 | Wiseman et al. | 705/14 |
| 2008/0169930 A1* | 7/2008 | Mallinson | 340/573.1 |
| 2008/0235348 A1 | 9/2008 | Dasgupta | |
| 2009/0063214 A1* | 3/2009 | Liu | 705/7 |

OTHER PUBLICATIONS

International Search Report and Written Opinion received for PCT Patent Application No. PCT/US2011/052023, mailed on Apr. 10, 2012, 9 pages.

Wikipedia, the free encyclopedia, document retrieved on Sep. 13, 2010, webpage available at: http://en.wikipedia.org/wiki/Nielsen_ratings.

Wikipedia, the free encyclopedia, document retrieved on Sep. 13, 2010, webpage available at: http://en.wikipedia.org/wiki/ITunes_Remote.

Wikipedia, the free encyclopedia, document retrieved on Sep. 13, 2010, webpage available at: http://en.wikipedia.org/wiki/TiVo.

Tuning in to TV data: The Official Google Blog, document retrieved on Sep. 13, 2010, webpage available at: http://googleblog.blogspot.com/2009/05/tuning-in-to-tv-data.html.

PCT International Search Report and Written Opinion issued in corresponding PCT/US2011/052023 dated Apr. 10, 2012, (9 pages).

European Patent Office, European communication pursuant to Rules 70(2) and 70a(2) regarding supplemental European search report dated Jul. 4, 2014 in application No. 11827269.9-1907/2619990 (1 page).

Taiwan Office Action in corresponding TW application No. 100133786 dated Sep. 23, 2014 [w/English translation] (21 pages).

Taiwan Search Report in corresponding TW application No. 100133786 dated Sep. 23, 2014 [w/English translation] (2 pages).

\* cited by examiner

VALIDATION OF TV VIEWERSHIP UTILIZING METHODS, SYSTEMS AND COMPUTER CONTROL LOGIC

CROSS-REFERENCE TO RELATED APPLICATIONS

This is a continuation of U.S. non-provisional application Ser. No. 12/924,237 filed Sep. 23, 2010, hereby expressly incorporated by reference herein

BACKGROUND

Television (TV) and the Internet are merging. Various frameworks such as the Widget Channel bring rich Internet experiences to TV viewers. For PC Internet browsing, a viewer's Internet access activities may be captured via cookies, allowing a customization and personalization of a viewer's PC Internet experience based on the viewer's interests. Thus, for web browser cookies, a service provider typically implements a cookie, which is a token stored on a viewer's platform to track usage of that particular service (and possibly of related services), and to personalize such service for the viewer. Cookies can accumulate information about use of the particular service over time, allowing the service to be personalized. However, because Internet TV browsing is done only via service-specific applications, the service access history or activities are not captured. The unavailability of information relating to service access history or activities makes it difficult for service providers to customize and personalize the TV service delivery experience on a connected TV/device.

TV viewing habits and/or commercial ratings data is typically collected and analyzed in an offline fashion by media research companies such as the Nielsen Company, using specialized equipment such as a "Home Unit" connected to a TV and installed in limited sets of selected households. There is no definite technique to measure if a program, such as content or an ad, was actually watched by a viewer. As things currently stand, not only is there a significant delay between the viewing time of a certain program and a time when information about that viewing time is available to content providers and advertisers, that information is valid only for the limited number of selected households installed with the specialized equipment—typically about 0.02% of the total TV households in the US).

U.S. Pat. No. 6,670,974 describes a solution for tracking and displaying information regarding platform usage over time in an interactive manner. This patent focuses on determining an association of platform usage patterns over time, and is unrelated to a viewer's TV content watching pattern.

As set forth in http://googleblog.blogspot.com/2009/05/tuning-in-to-tv-data.html regarding Google TV, the set top box (STB) may be configured to send data to a server for processing, the data including information on proof of play of ads by the STB. A report is generated offline that describes the total number of viewers tuned to a given channel on a per-second basis.

As set forth in U.S. Published Patent Application 20080235348, a viewer's channel changes may be captured on a STB, and a set of timers may be used to determine which set of programs the viewer watched. The processing considers whether the viewer has spent enough time on a specific channel to have been considered watching rather than merely surfing. The result is a list of the viewer's viewing history, which can be delivered remotely and delivered both visually and audibly to the viewer.

Additionally, as set forth in http://en.wikipedia.org/wiki/TiVo, the prior art tracks a viewer's viewing habits through monitoring remote key presses such as fast forwarding through a program or replaying a program.

To date, however, no solution exists for providing personalization of a viewer's service access history or activities with respect to Internet TV browsing, for example on a real-time basis.

BRIEF DESCRIPTION OF THE DRAWINGS

Some embodiments are described with respect to the following figures.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of embodiments. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments allow capturing a viewer's usage pattern of an Internet TV platform to allow personalization of the viewer's TV experience. The platform may include, for example, personal devices such as mobile computing/communication devices (e.g., PDAs, phones, MIDs), fixed and portable computing devices (laptops and desktops), and cloud computing services and platforms. Both raw data and profiles derived from an analysis of the data may have a potentially high value to content providers and advertisers. According to one embodiment, a methodology and architecture are provided to capture a viewer's usage pattern of an Internet TV platform, such as, for example, their TV internet browsing experience and time spent in each service or application. This information may then be used to create and/or enhance a profile of the viewer, determine the viewer's interests, customize programs (i.e. content or ads) and services made available to them, and generate personalization for programs and services to the viewer. For example, if the viewer accesses financial sites regularly on her TV, a service from a financial institution may be recommended, and news and financial content may also be recommended to the viewer's as a personalization of the viewer's experience. If the viewer frequently purchases movie tickets via a movie widget, advertisers, network providers may tailor advertisements being sent to the viewer to be about movie previews and movie content. Additionally, a profile regarding the viewer's usage pattern may be provided as a service to providers of TV programs. Embodiments allow implementation of tracking and personalization architecture on the TV platform, allowing the tracking of usage of all services on the platform over time and across invocations.

Embodiments focus on an interaction between a viewer and their Internet TV platform in order to capture data from those interactions that would allow personalization of programs, applications and/or services for the viewer. For example, if a viewer is watching a certain program on an Internet TV platform, embodiments may allow the gathering of click stream information based on the viewer's interactions with the platform, including, for example, channel changes, participation including for example voting, the use of social media, shopping interactions, application or information downloads, and application usage, to name a few. Such click stream information may be captured according to some embodiments and used to obtain behavioral or demographic information that may allow more focused personalization. The captured interactions are not limited to click stream information according to embodiments, and may include any measurable interactions of a viewer with the Internet TV platform, such as through a keyboard, mouse, tablet, or stylus to name a few.

Figure 1:
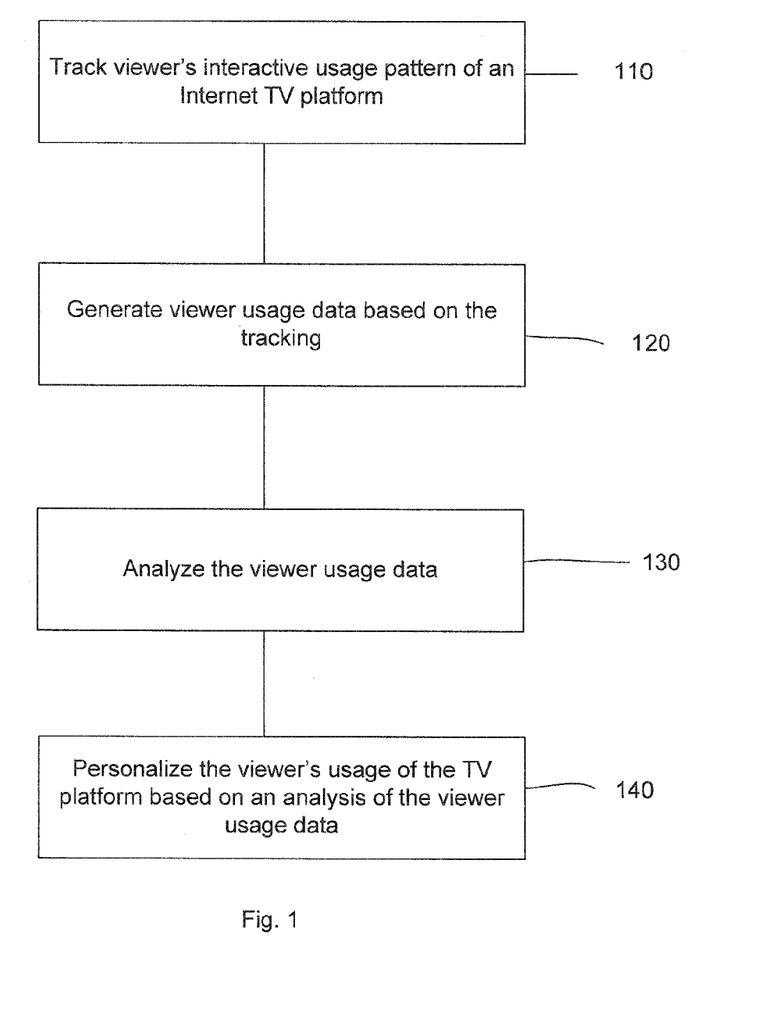
FIG. 1 is a flowchart depicting a method embodiment.

Referring first to FIG. 1, a flowchart is shown of a method embodiment. According to the shown embodiment, a method includes, at block 110, tracking a viewer's interactive usage pattern of a TV platform. The interactive usage pattern refers to a viewer's interactions with the Internet TV platform, such as through any interaction tool, including for example a smartphone, smart remote, MID, netbook or laptop PC. The method further includes, at block 120, generating viewer interactive usage data based on the tracking, at block 130, analyzing the viewer usage data, for example on a substantially real-time basis, and at block 140, personalizing the viewer's usage of the TV platform based on an analysis of the viewer's usage data. Embodiments advantageously allow service providers to use the viewer's usage data obtained from a viewer's interactions with the TV platform to better tailor offers to the viewer, to better understand their customers, or to repackage and sell (or otherwise monetize). The method embodiment of FIG. 1 may be implemented for example using the architectures shown in the embodiments of FIG. 2 or 4 to be described below.

Figure 2:
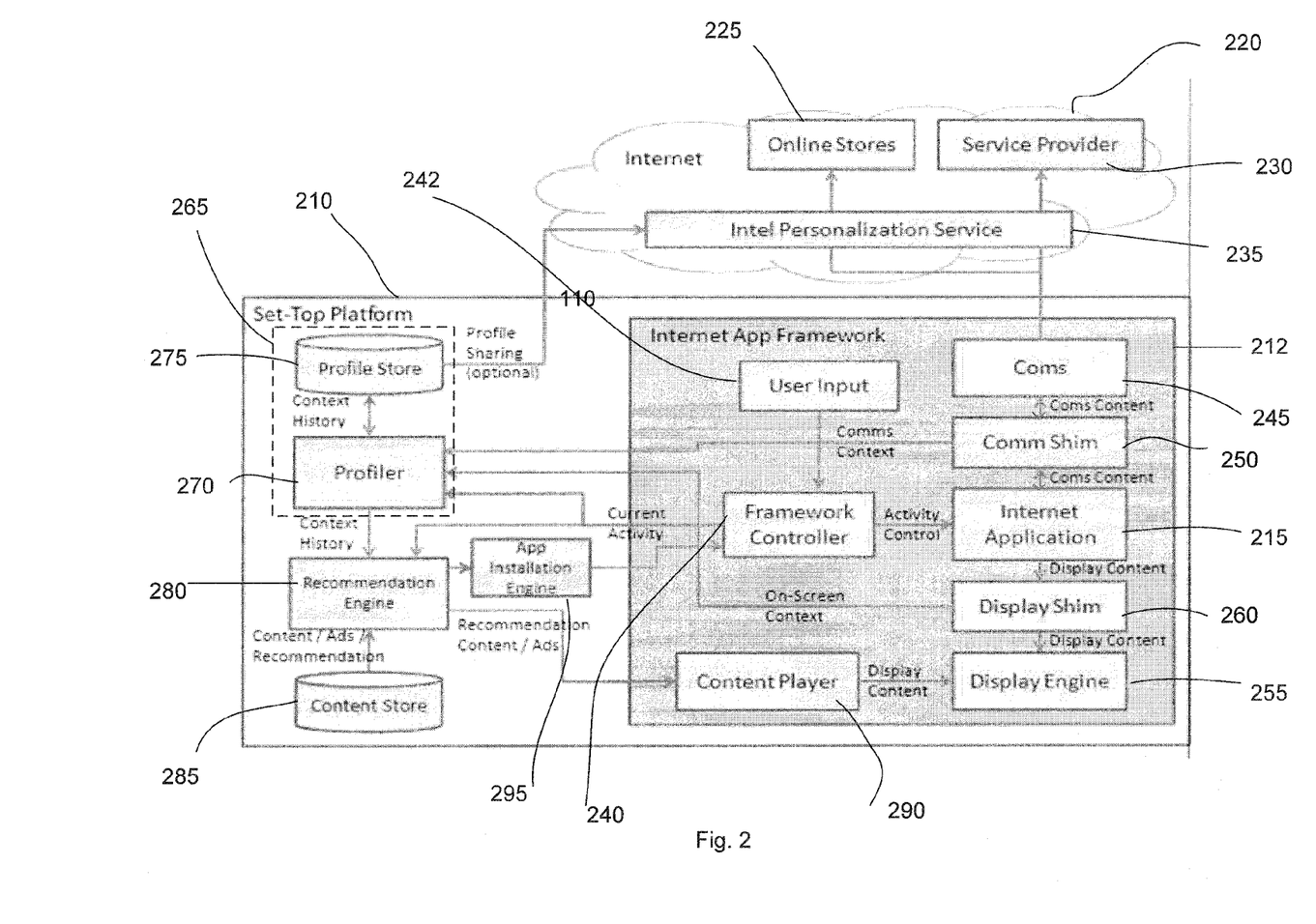
FIG. 2 is an architecture according to one embodiment.

FIG. 2 depicts an architecture according to a first embodiment. The architecture shown may be implemented as part of an Internet TV set top platform or set top box (STB) 210 which includes an Internet Application Framework 212. The Internet Application Framework may be adapted to support the execution of Internet Application modules on the STB 210. Several modules may capture the viewer's interactions with the Internet TV platform, including for example the time spent in each TV Internet application (e.g., a widget), and browsing patterns if any. Internet Application Framework 212 may be adapted to interact with online services such as the Internet 220. The Internet itself as shown may include online stores 225 and service providers 230, and in addition, a Personalization Service 235, the role of which will be set forth in further detail below. Framework Controller 240, which is part of the Internet Application Framework 212, may be adapted to control an operation of the Internet Application 215, and to determine when Internet Application 215 is activated and deactivated. Framework Controller 240 may further be adapted to track and capture viewer interaction data through a User input interface 242. The user input interface 242 may, for example, include a TV remote, a Smartphone, or other various mobile platforms such as a smart remote, a mobile interne device (MID), or a netbook or laptop PC interface. To interact with the Internet, the Internet Application 215 may use a Communication layer 245 and a Communication Shim 250. To interact with a viewer, the Internet Application may use a Display Engine 255 and a Display Shim 260. Using shim layers between the Internet Application 215 and either the Communication layer 245 or the Display Engine 255 may allow more fine grained information to be obtained from Internet applications. For example, when the viewer is using a stock application, a combination of information from Communication Shim 250 and Display Shim 260 may allow a determination of which stocks the viewer may be viewing (via the Display Shim 260), and also whether the viewer is merely checking stock prices or actually trading (via the Communication Shim 255). As a result, more detailed information may be obtained, such as, for example, information on product categories of interest to the viewer (e.g. financial, travel, electronics, fashion), specific products of interest, and level of interest (e.g. browser vs. purchaser).

The shown architecture of FIG. 2 may allow the tracking of a viewer's interactive usage pattern with an Internet TV platform, and generation of the viewer's usage data from the usage pattern. The viewer's usage data may be obtained from the Communication layer 245, Communication Shim 250, Display Engine 255, Display Shim 260 and/or the User input interface 242. The data captured/generated may include information on the type of application used (e.g. sports, stocks, movies, etc), the time of day, time spent in the application or widget, the rating of the application (e.g. PG, A, etc) and the viewer's i.d. Such data is shown in FIG. 2 as "Current Activity" emanating from Framework Controller 240. In addition, the data may include communications context data as described above emanating from the Communication Shim 250, and/or on-screen context data as described above emanating from the Display Shim 260. The viewer's usage data may be provided, for example on a substantially real-time basis, to a Profile Engine 265, which, in the shown embodiment, includes a Profiler 270 and a Profile Store or memory 275. The Profiler 270 may create a profile for each viewer based on the viewer's usage data, and stores in the Profile Store, which may include, for example, the local hard disk drive of an Intel Architecture System-on-a-Chip (IA SoC) based connected audio/video device (CAV device). Optionally, to safeguard against misuse or stealing of the profile, the profile may be encrypted before storage onto Profile Store 275.

Referring still to FIG. 2, in order to allow personalization of the viewer's usage experience, the viewer's usage data may be used to personalize the viewer's content viewing experience, including the sending of programs of interest such as targeted ads, via a Content Store 285, and/or, it may be used to personalize the viewer's Internet usage experience via the Internet such as by suggesting Internet content including advertisements, services and/or applications.

To personalize the viewer's convent viewing experience from the Content Store 285, the viewer's usage data may be sent to a Recommendation Engine 280, which may be adapted to generate program (i.e. content or ads) recommendations based on the viewer's profile. The Recommendation Engine 280 may, for example, use a correlation between the viewer's usage data and content/ad data from a Content Store 285 in order make recommendations to the viewer, for example by sending such recommendation information to the Internet Application Framework 212 via a Content Player 290. The Content Store 285 may be configured to access, for example, a local cache of movies on a hard disk, a cache of movies provided by third parties (such as, for example, provided by services such as TiVo), a DVD juke box, a module for accessing a content service such as Hulu, YouTube, or Netflix, to name a few. The recommendations could further for example concern programs or services from targeted ad solution providers such as Invidi, from multiple system operators (MSO's) such as Comcast, from ad management solution providers such as BlackArrow, from ad agencies such as GroupM, and from content providers such as CBS.

To personalize the viewer's platform usage experience by way of the Internet, the Profile Store 275 may share some of all of the viewer's profile with the Personalization Service 235. Personalization Service 235 may in turn share the viewer's usage data with third party profile engines (such as, for example, profile engines for Amazon, Google, iTunes, etc), which may then use the viewer's usage data to recommend programs, services or applications to the viewer.

Regardless of the manner of personalization, that is, whether through the Content Store 285 or directly by way of third party profile engines, should the viewer select a service that is not installed in her CAV device, an Application Installation Engine 295 may automatically download the service on the STB, such as on the IA SoC based device. Provision of the viewer usage data to the Profiler 270 and a correlation of the data with programs or services of interest to the viewer may be performed for example on a real-time basis, in this way advantageously allowing a near contemporaneous personalization of the viewer's usage experience, for example with targeted ads.

Advantageously, embodiments such as the embodiment of FIG. 2 allow the provision of a platform architecture to capture interactive service usage information and to deliver actionable information for personalizing services, for example on a substantially real time basis. In addition, the creation of a viewer's profile and delivery of recommendation for content/ads and/or services based on the profile, for example on a real time basis, allow a much more targeted personalization of the viewer's experience based on the profile.

Figure 3:
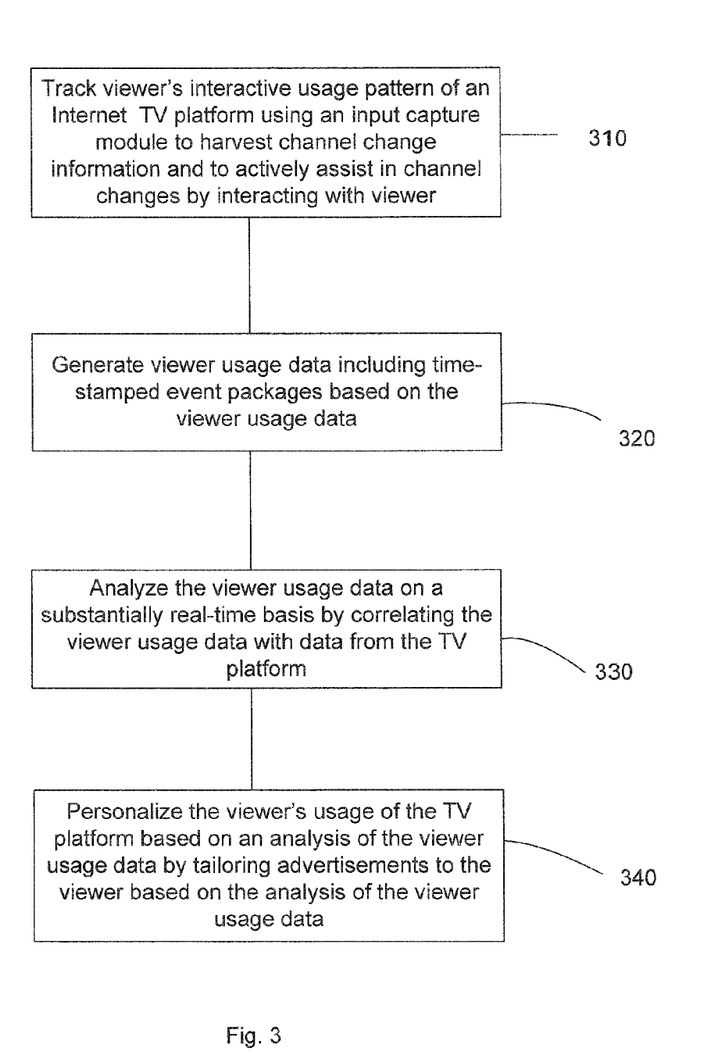
FIG. 3 is a flowchart depicting another method embodiment.
Figure 4A:
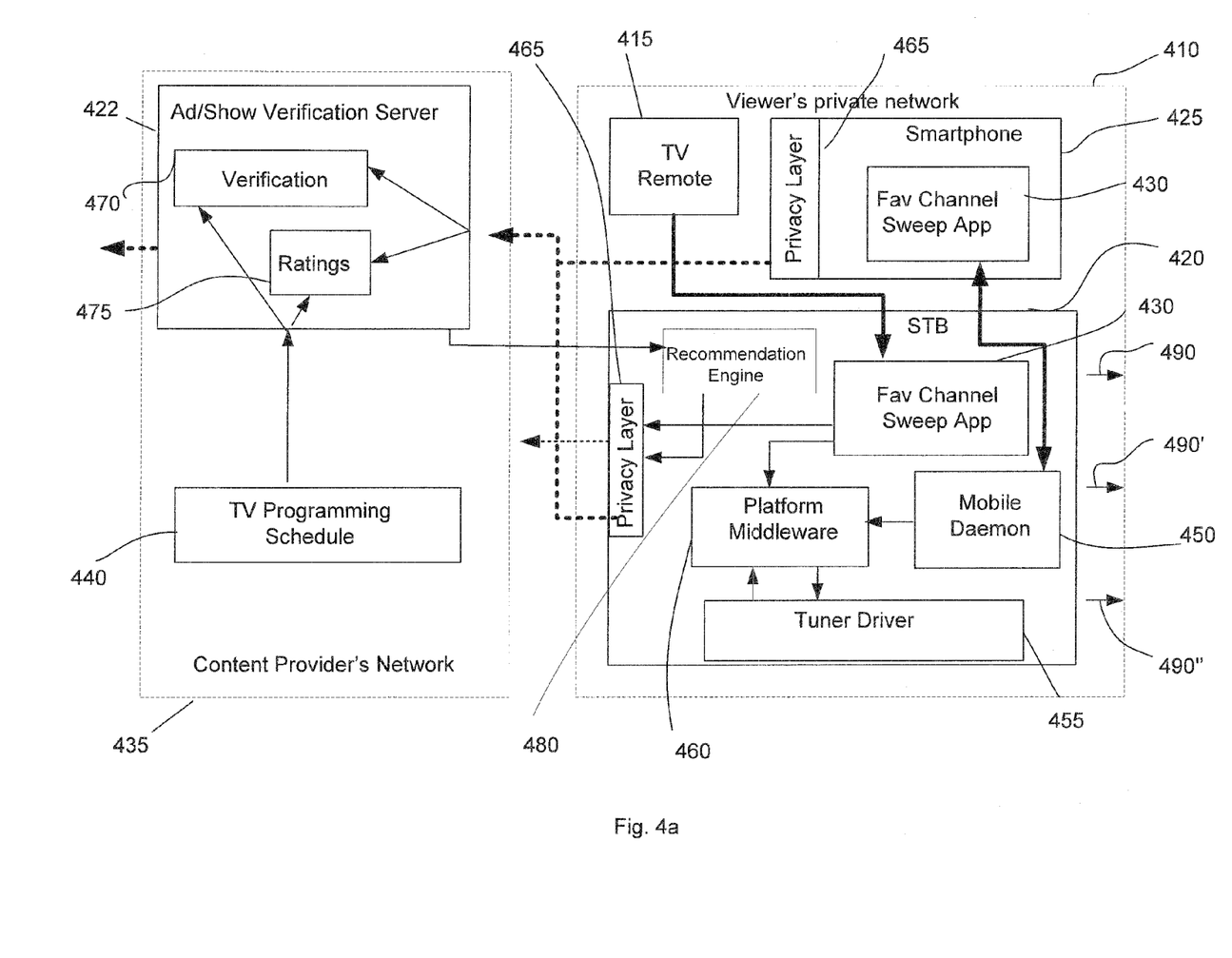
FIGS. 4a and 4b represent two alternative architecture embodiments.
Figure 4B:
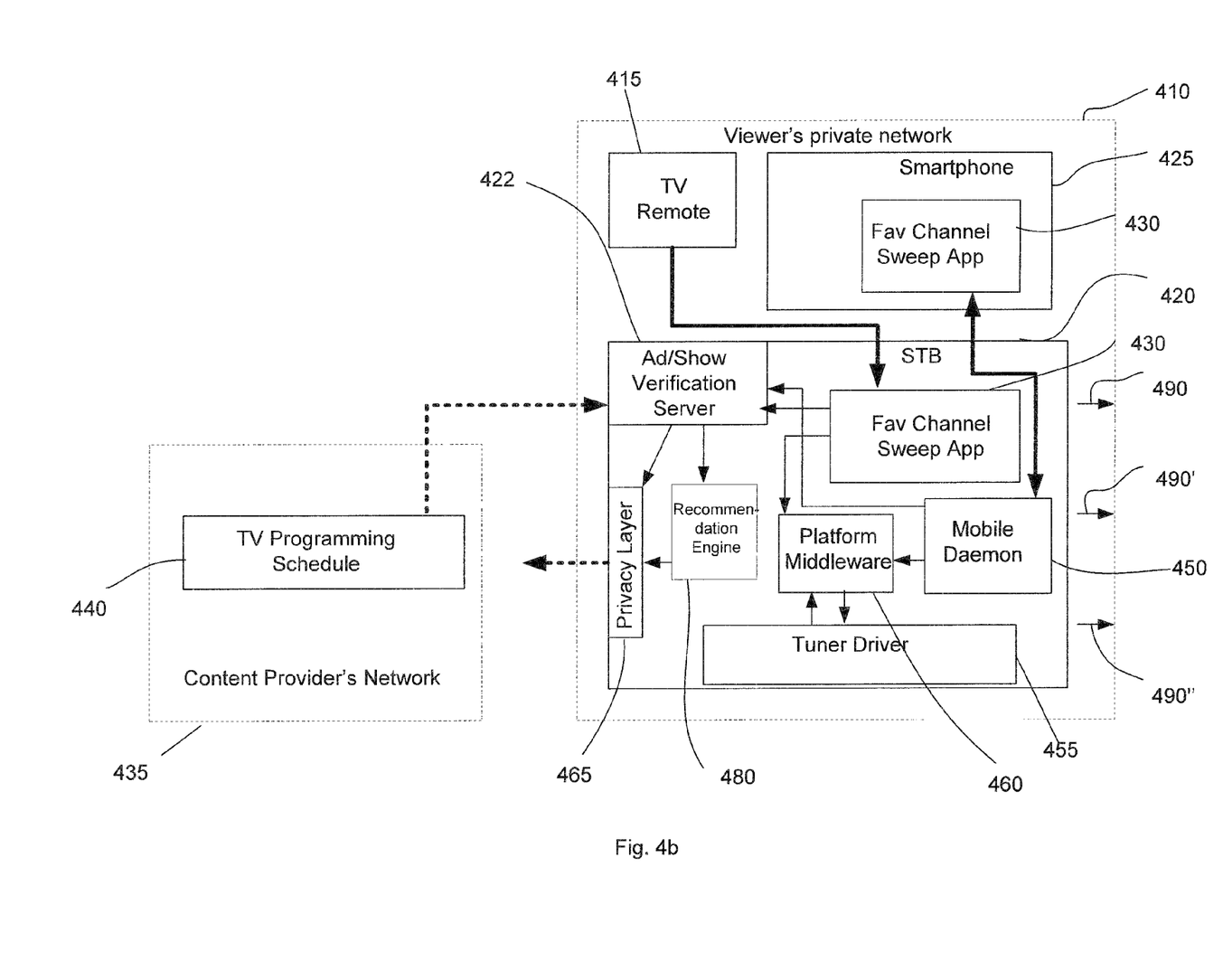

Other embodiments, exemplary versions of which is shown in either of FIGS. 3, 4a and 4b, provide an architecture for identification of ads and content watched by a viewer on TV through the use of a personal mobile device and/or STB without the need for specialized equipment. There are three elements that may apply with respect to some embodiments similar to the embodiment of FIGS. 3, 4a and 4b: the use of a viewer input capture module that incentivizes the viewer to utilize the module, allowing viewer interaction as an input to a verification component; the use of a mechanism and software framework that is adapted to interpret viewer interactions to verify that a viewer actually watches a program (such as an ad, for example) and that captures a viewer's interests on a substantially real-time basis; and personalization of the viewer's TV experience. Additionally, one or more mechanisms may be provided to automatically rate a program based on how long a viewer actually watches the program. Embodiments of FIGS. 3, 4a and 4b, which will be described in further detail below, may be particularly suited for example to determine the efficacy of advertisements.

Referring first to FIG. 3, a flowchart is shown of a method embodiment. According to the shown embodiment, a method includes, at block 310, tracking a viewer's interactive usage pattern of an Internet TV platform by using an input capture module to harvest channel change information and to actively assist in channel changes by interacting with the viewer, at block 320, generating viewer usage data based on the tracking; at block 330, analyzing the viewer usage data by correlating the viewer usage data from data from the TV platform, for example on a substantially real-time basis; and at block 340, personalizing the viewer's usage of the TV platform based on an analysis of the viewer's usage data by tailoring advertisements to the viewer based on the analysis of the viewer usage data. Embodiments advantageously allow service providers to use the viewer's usage data to better tailor offers to the viewer, to better understand their customers, or to repackage and sell (or otherwise monetize). The method embodiment of FIG. 3 may be implemented for example using the architectures shown in the embodiments of FIGS. 4a and 4b to be described below.

A concept of the embodiment of FIGS. 3, 4a and 4b may best be illustrated in the following usage example.

Alex uses his Smartphone as a remote control to watch an Internet TV program. During commercial breaks, while watching his favorite shows, Alex (like many others) likes to flip through a set of his favorite TV channels to see if there is anything else interesting on those channels, unless the ad playing on the current channel catches his eyes. Alex has to remember to flip back to his original channel every so often to avoid missing the rest of the show after resuming from commercial break, which is inconvenient. With a single touch, according to an embodiment, Alex can activate an application on his Smartphone that automatically sweeps through his favorite channels, and automatically switches back to the original channel before the commercial break is over. To use the application, Alex can simply configure a prioritized list of favorite channels. When commercial break begins, he presses a <start> button of the application, which orchestrates a channel sweep on the TV or Set-Top Box. Similar to channel auto scanning in FM/AM radio, the application stays at each channel for a pre-defined short period of time before moving to the next channel. During the process, Alex can stop at any channel by pressing the <stay> button if he sees something that catches his eyes on the channel, including either a show or commercial. He can also press the <resume> button to continue channel sweeping. In any case, the application will automatically switch the TV back to the original channel before the commercial break ends so Alex can continue enjoy the original show without missing out anything. A reminder message box (together with audio reminder) can pop up a few seconds before switching back the channel. Alex can choose to stick with the current channel by pressing a button on the message box; or do nothing and the channel is automatically switched back to the original channel.

The scenario described above is just one example that utilizes a Smartphone as implementing a user interface (UI) device; other implementations on various mobile platforms such as smart remote, MID, netbook or laptop PC, are also possible. One attractive alternative implementation is an applet (e.g., a widget) on a STB that supports an application execution environment (such as the widget channel). In that case, a viewer may use a standard STB remote as the UI.

The above usage example illustrates an approach that incentivizes viewers to interact through the UI devices and provide conscious input during TV watching experience. Because the viewer is consciously and explicitly interacting with the UI devices to choose what to watch, it is highly likely that the viewer will watch the content he has chosen. The viewer's actions can be correlated directly with ad or program content watched. For example, the fact that Alex pressed the <start> button to activate the auto channel sweep feature indicated that he did not watch the ad coming up on the current channel during the commercial break of the show. And if he pressed the <stay> button sweeping through a channel, it meant he did watch whatever was playing on that channel at that moment. Channel change information is very valuable because it carries context about what the viewer is interested in and not interested in.

Currently viewers are de-incentivized from changing channels out of fear of missing their show. Instead, they typically choose to do something else (talk, read, web browser, use the bathroom, get a snack, reply emails, IM with friends, etc.) while waiting for the show to come back on. As a result, there is no indication whether or not they watched the TV. Embodiments such as the embodiment of FIGS. 4a and 4b take advantage of this observation and provide viewers an easy way to safely change channels. Thus viewers are given incentive by providing an automated channel surfing utility from their Smartphone or TV smart remote to stay and continue paying attention to the TV program (without missing the current show) while in the meantime allowing a harvesting of channel change information.

Referring now to FIGS. 4a and 4b, where like reference numerals refer to like components, two respective embodiments include an architecture for harvesting relevant information from viewer usage data obtained from a input capture module, such as a UI component as described above, for the purpose of analyzing the viewer usage data, such as in the form of ad delivery verification. While the embodiment of FIG. 4a pertains to an analysis of the viewer usage data at the Content Provider's Network 435, the embodiment of FIG. 4b pertains to an analysis of viewer usage data in the STB of a Viewer's Private Network 410, as will be described in further detail below. It is noted that each of the embodiments of FIGS. 4a and 4b further include two sub-embodiments or options, one pertaining to the provision of a UI component or Favorite Channel Sweep Application 430 residing in a Smartphone or other similar device external to the STB within the Viewer's Private Network 410, and the other pertaining to the provision of the UI component within STB, in which case a TV remote 415 may be used by a viewer to change channels, as will be described in further detail below.

As shown in the architectures of FIGS. 4a and 4b, a Viewer's Private Network 410 may include a STB 415, and at least one of a TV remote 420 and a Smartphone 425. At least one of the STB 415 and the Smartphone 425 may include a UI component in the form of a Favorite Channel Sweep Application 430 on at least one of the Smartphone 425 and the STB 415. The Channel Sweep Application 430 may be adapted to capture viewer interactions while a the same time issuing commends to control switching TV channels based on viewer input. The Favorite Channel Sweep Application may abstract viewer usage data including information on viewer interactions to a series of time-stamped event packages. Each event package may, according to an embodiment, be captured in many forms that are suitable to be transported via a network connection. An example of an event package according to an embodiment shown in XML format is as follows:

```
<?xml version="1.0" encoding="utf-8"?> <AdVerificationDataStream>
<ChannelSweep CurrentChannel="TNT" SweepStartTime="11/16/09
18:33:00" SweepStopTime="11/16/09 18:38:00"> <Destination
Channel="CBS" Dwell Time="00:01:00" Timestamp="11/16/09
18:34:00" /> <Destination Channel="NBC" Dwell Time="00:00:30"
Timestamp="11/16/09 18:36:00" /> <Destination Channel="HBO" Dwell
Time="00:00:30" Timestamp="11/16/09 18:37:00" /> </ChannelSweep>
</AdVerificationDataStream>
```

The example event package above encapsulates enough information to infer viewing of a specific advertisement or TV show, provided one has access to the ads airing schedule data. Each channel sweep by the Favorite Channel Sweep Application 430 may include a header that captures the start/end time of the channel sweeping, the current viewing channel, followed by a payload that includes a series of sub-entries such as "Destination Channel," which may include the channel that the viewer explicitly indicated interest in by pressing the <stay> button, "Dwell Time," which may represent the amount of time the viewer spent dwelling on the corresponding destination channel, and "Timestamp," which may represent the time when first entering the noted destination channel.

Referring still to FIGS. 4a and 4b, if the Channel Sweep Application resides on Smartphone 425, it may send information regarding the viewer's usage pattern to the STB 420 through Mobile Daemon 450. The Mobile Daemon 450 may be a proxy that is coupled to Tuner Driver 455 and that provides a network interface for the UI component, such as for example for Channel Sweep Application 430 on Smartphone 425, to control tuning to different channels by controlling the Tuner Driver 455 through the Platform Middleware 460 based on commands from the Channel Sweep Application 430. The Daemon 450 may communicate with the Channel Sweep Application 430 on Smartphone 425 using any appropriate communication channel, either wired or wireless, receiving remote channel change commands. On the other hand, if the Channel Sweep Application (such as, for example, a TV widget) resides on STB 420, it may send such channel change command information regarding the viewer's usage pattern to the Platform Middleware 460 (such as, for example, a widget engine) directly in order to control the Tuner Driver 455. The Platform Middleware 460 may provide API's to all of the platform hardware components such as graphics, video and audio engines (not shown), and may control the tuner by setting channels, and determining the channel(s) in use.

In either case, as previously mentioned, the viewer usage data may be sent to an Ad/Show Verification Server 422, which may reside either in the Content Provider's network 435 as shown in FIG. 4a, or in the STB 420 as shown in FIG. 4b, other locations for the Ad/Show Verification Server being within the scope of embodiments. Thus, one option as shown in FIG. 4a may involve analysis performed at an Ad/Show Verification Server 422 that is part of the Content Provider Network 435 which may include a TV Programming Schedule database 440, including a TV ad schedule, while another option as shown in FIG. 4b would be to have the analysis occur at the STB 420 at an Ad/Show Verification Server 422 that is part of the STB. This last option as shown by way of example in FIG. 4b may increase viewer privacy and accommodate targeted advertising selected by the STB, but requires the Content Provider 435 to distribute an ad and content schedule. In the first case as shown by way of example in FIG.

4a, the viewer usage data, in the form of channel sweep data, may be sent to the Content Provider 435, which may use its programming schedule, including its ad schedule, to perform the analysis by determining which ads and content were viewed.

As seen in FIG. 4a, event packages may be sent from Channel Sweep Application 430, either from the Smartphone 425 or from the STB 420, to Ad/Show Verification Server 422 of the Content Provider's Network through a secure link. As seen in FIG. 4b, where the Channel Sweep Application 430 resides in the Smartphone 425, the Mobile Daemon 450 may be used send viewer usage data to the Ad/Show Verification Server 422 of STB 420. In the alternative, where the Channel Sweep Application 430 resides in the STB, the Channel Sweep Application 430 may directly send viewer usage data to Ad/Show Verification Server 422 of STB 420.

Referring to FIGS. 4a and 4b still, Ad/show Verification Server 422 may in each case include a verification module 470 and a ratings module 475. Thus, to infer ad viewership for example, the Ad/Show Verification Server 422 may access information from the TV Programming Schedule database 440, including ad schedules, to have the verification module 470 analyze the viewer usage data by correlating each destination channel entry with an ad according to the timestamp. If the timestamp of the channel corresponds to an ad, and the Dwell Time is greater than a predetermined duration, such as, for example, 15 seconds, the ratings module could be infer that the viewer consumed the ad. The time spent by the viewer before he switches the channel could also be used by the ratings module 475 to rate the commercial. For instance, if the viewer watched an entire 30 second ad, the rating for this ad could be assumed to be 10 (on the basis of a 1-10 rating). If the viewer watched 25 seconds, the rating can be considered as 9 and so on. This mechanism generates rating of a commercial without viewer's explicit input, offering seamless TV viewing experiences while gathering unbiased feedback from viewers. An analysis of the viewer usage data could also used to infer what TV content the viewer watched during the commercial breaks, by correlating event timestamps with the TV programming schedule. The result could indicate shows that the viewer might be interested in, especially if the data indicates that the viewer chose to stay with a different program instead of switching back, which could affect show ratings and indicate that the viewer should record these shows in the future.

Referring still to FIGS. 4a and 4b, data obtained from an analysis of the viewer usage data by the Ad/Show Verification Server 422 may be sent to a Recommendation Engine 480, which may be adapted to personalize the viewer's usage experience by generating a program (i.e. content or ads) recommendations based on the viewer's profile, for example on a substantially real-time basis. Because the viewer's interactions may be captured by the system on a substantially real-time basis, implementation of such a Recommendation Engine may become possible. The recommendations could for example concern ads from targeted ad solution providers such as Invidi, from multiple system operators (MSO's) such as Comcast, from ad management solution providers such as BlackArrow, from ad agencies such as GroupM, and from content providers such as CBS Additionally, the Recommendation Engine 480 may use the viewer's usage data to recommend services offered by third parties, such as, for example, Amazon, or Google, as depicted by an arrow emanating therefrom and extending to the privacy layer. Although in the shown embodiments of FIGS. 4a and 4b, the Recommendation engine 480 is shown as residing within the viewer's private network 410, embodiments are not so limited, and include within their scope the provision of a recommendation engine to receive a viewer's usage data anywhere, such as within the Content Provider's Network 435 for example, or at another location.

Optionally, a privacy layer 465 may be provided at either the Smartphone and/or the STB in order to allow a control of the release of sensitive viewer information prior to transmission. This would allow the viewer to decide whether or not to share private information with the content provider. Additionally, optionally, the viewer usage data may be sent to third party advertisers from the Ad/Show Verification Server, as depicted by an arrow emanating therefrom and extending beyond the Content Provider Network in FIG. 4a, or as depicted by an arrow emanating from the Privacy Layer 465 of STB 420 in FIG. 4b.

Advantageously, some embodiments as described for example in relation to FIGS. 3, 4a and 4b, allow the use of an application that assists in surfing, instead of requiring timers to determine what programs a viewer watches. Thus, rather than passively watching surfing behavior, some embodiments propose an active interaction with the viewer through an input capture module, which enables a more accurate determination of a viewer's presence and interests, for example on a substantially real-time basis. The above allows targeted ad campaigns. Implementation of such embodiments further advantageously: may use off-the-shelf hardware/software platforms; may allow easy installation including both on the Smartphone and on the STB, reaching a much larger viewer base; may provide near real-time ad viewing verification thus allowing advertisers to fine tune/re-calibrate their ad campaigns based on current ad watching data, thus providing the advertisers with an opportunity to maximize their returns; may provide smooth TV viewing experiences while at the same time collecting implicit commercial ratings from viewers; may incentivize viewers through an input capture module, to interact with the TV during commercial breaks, as a result of which a viewer's interactions with the TV may be analyzed, bringing value to advertisers; may provide a low cost, lightweight and scalable solution that has the potential to reach a large viewer base compared to existing media research technology.

According to embodiments, it is possible to capture a viewer's channel watching pattern, and interface this information with for example a multiple system operator's (MSO's) Ad schedule and metadata to determine which ads were consumed and at what time of the day. This information can be provided to advertisers, media buyers, and ad network in near real-time. In turn, advertisers and media buyers can use this information to fine tune and calibrate their Ad Campaign, if needed.

While a single STB is shown in FIGS. 2, 4a and 4b, according to embodiments, one or more STB's may be present to the same viewer in the same household/location. All such STB's could be implemented to function as noted with respect to the embodiments of FIGS. 2, 4a and 4b. Moreover, more than one household/location could have STB's, each of those STB's in the respective households/locations being apt to be implemented to function as noted with respect to the embodiments of FIGS. 2, 4a and 4b.

The structure of the various components and applications shown in FIGS. 2, 4a and 4b, such as the STB, the input capture module or the Ad/Show verification server, may vary in various embodiments, as would be understood by a person of skill in the art. For example, the Framework Controller, Profile Engine or Recommendation Engine of FIG. 2, or the Favorite Channel Sweep Application or Ad/Show Verification Server of FIGS. 4a and 4b, may be embodied in a network node that includes a server or other device having one or more programmable processors, or otherwise having the circuitry required to achieve the noted functions.

In addition, one or more features disclosed herein may be implemented in hardware, software, firmware, or combinations thereof, including discrete and integrated circuit logic, application specific integrated circuit (ASIC) logic, programmable gate arrays, and/or microcontrollers, or may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 5:
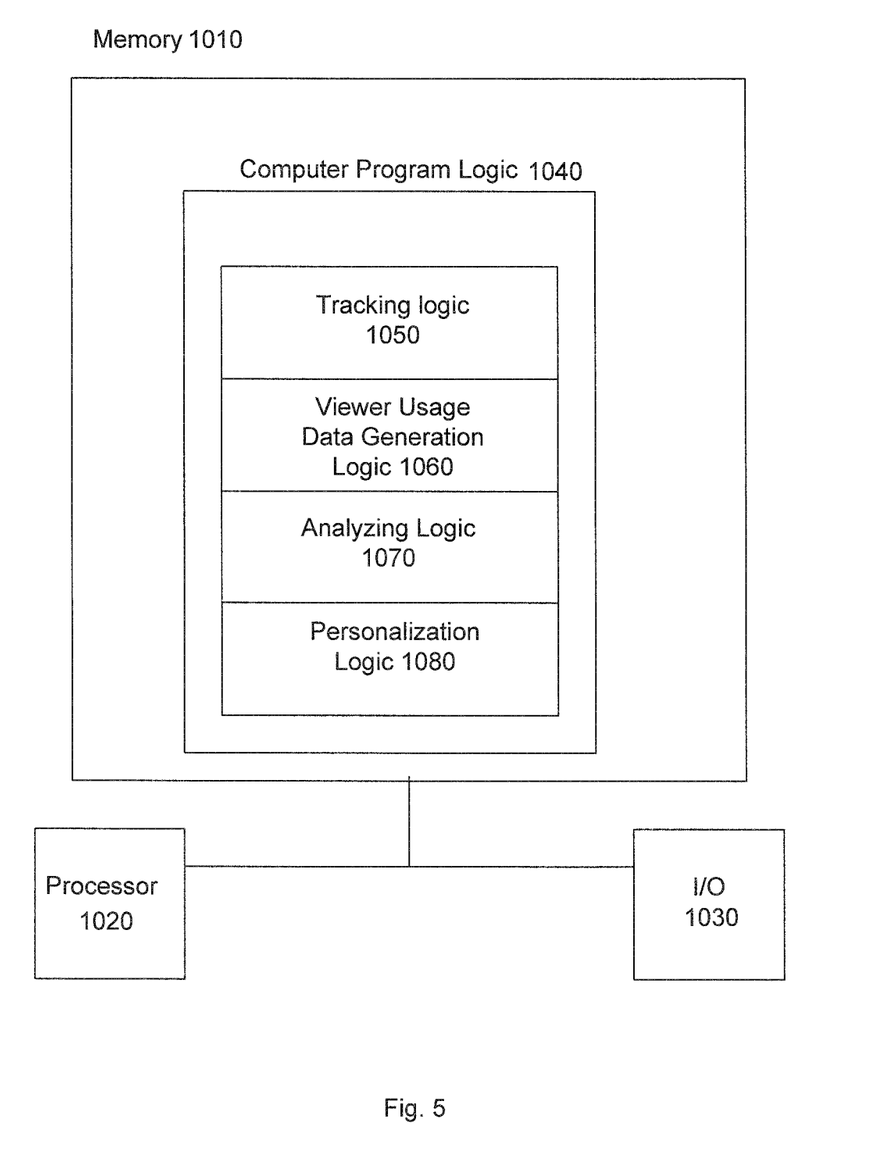
FIG. 5 represents a system and computer control logic according to one embodiment.

Software or firmware embodiments are illustrated in the context of computing system shown in FIG. 5. In FIG. 5, system 1000 may include a processor 1020 and a body of memory 1010 that may include one or more computer readable media that may store computer program logic 1040. Memory 1010 may be implemented as a hard disk and drive, a removable media such as a compact disk and drive, a read-only memory (ROM) or random access memory (RAM) device, for example. Processor 1020 and memory 1010 may be in communication using any of several technologies known to one of ordinary skill in the art, such as a bus. Computer program logic 1040 contained in memory 1010 may be read and executed by processor 1020. One or more I/O ports and/or I/O devices, shown collectively as I/O 1030, may also be connected to processor 1020 and memory 1010.

Computer program logic 1040 may include logic 1050 configured to cause the processor to track a viewer's usage pattern of a TV platform. Computer program logic 1040 may also include logic 1060 configured to cause the processor to generate viewer usage data based on the tracking. The computer program logic 1040 may further include logic 1070 to cause a processor to analyze the viewer usage data for example on a substantially real-time basis, and logic 1080 to personalize the viewer's usage of the TV platform. In other embodiments, the computer program logic 1040 may be organized differently in order to implement the processing described herein. Different logic modules may be used instead of those shown in FIG. 5. Moreover, in alternative embodiments, more or fewer logic modules may be used, as would be understood by those skilled in the art. By way of example, in the embodiment of FIG. 2, the tracking of a viewer's usage pattern and the generation of viewer usage data may take effect in the Communication Shim 250, the Display Shim 260 and the Profiler 270, while in the embodiments of FIGS. 4a and 4b tracking and generation may be effected by the Favorite Channel Sweep Application 430. In addition, by way of example, in the embodiment of FIG. 2, the analyzing logic and personalization logic may be implemented in the Profiler 270, Recommendation Engine 280, and Application Installation Engine 295, plus the Personalization Service 235, while in the embodiments of FIGS. 4a and 4b the analyzing logic and personalization logic may be implemented in the Ad/Show Verification Server 422 and Recommendation Engine 480. The above are merely examples, and other implementations of the logic components shown in FIG. 5 are within the purview of embodiments.

While certain features of embodiments have been illustrated and described herein, many modifications, substitutions, changes, and equivalents may occur to those skilled in the art. It is, therefore, to be understood that the appended claims are intended to cover all such modifications and changes as fall within the true spirit of embodiments.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer executed method comprising:
   identifying an advertisement viewed by user;
   electronically determining the user's level of interest in the advertisement based on the activities undertaken during the advertisement by the user while the advertisement was being viewed by the user;
   electronically compiling a list of favorite channels;
   in response to a single touch actuation by the user, automatically switching from displaying a first channel to displaying the favorite channels one after another;
   checking for a user command to stop displaying favorite channels one after another and to maintain the display of a current favorite channel; and
   in response to detecting the end of a commercial, displaying a message indicating that display is about to switch back to said first channel, checking for a user command to continue displaying the currently favorite channel and automatically switching back to displaying the first channel if the user command is not received.

2. The method of claim 1 wherein electronically determining includes monitoring the time spent by the user viewing the advertisement.

3. The method of claim 1 including verifying whether the user is actually viewing the advertisement.

4. The method of claim 2 including providing the determination of the level of interest to an advertiser.

5. The method of claim 1 including identifying an advertisement displayed on television.

6. The method of claim 1 including identifying an advertisement viewed on a web page.

7. A non-transitory computer readable medium storing instructions to execute a sequence comprising:
   identifying an advertisement viewed by user; and
   electronically determining the user's level of interest in the advertisement based on the activities undertaken during the advertisement by the user while the advertisement was being viewed by the user;
   electronically compiling a list of favorite channels;
   in response to a single touch actuation by the user, automatically switching from displaying a first channel to displaying the favorite channels one after another;

checking for a user command to stop displaying favorite channels one after another and to maintain the display of a current favorite channel; and in response to detecting the end of a commercial, displaying a message indicating that display is about to switch back to said first channel, checking for a user command to continue displaying the currently favorite channel and automatically switching back to displaying the first channel if the user command is not received.

8. The media of claim 7 wherein electronically determining includes monitoring the time spent by the user viewing the advertisement.

9. The media of claim 7, the sequence including verifying whether the user is actually viewing the advertisement.

10. The media of claim 8, the sequence including providing the determination of the level of interest to an advertiser.

11. The media of claim 7, the sequence including identifying an advertisement displayed on television.

12. The media of claim 7, the sequence including identifying an advertisement viewed on a web page.

13. An apparatus comprising:

a processor to identify an advertisement viewed by a user and determine the user's level of interest in the advertisement based on the activities undertaken during the advertisement by the user while the advertisement was being viewed by the user, electronically compile a list of favorite channels, in response to a single touch actuation by the user, automatically switch from displaying a first channel to displaying the favorite channels one after another, check for a user command to stop displaying favorite channels one after another and to maintain the display of a current favorite channel, and in response to detecting the end of a commercial, display a message indicating that display is about to switch back to said first channel, check for a user command to continue displaying the currently favorite channel and automatically switch back to displaying the first viewed channel if the user command is not received; and a memory coupled to said processor.

14. The apparatus of claim 13, said processor to identify the time spent by the user viewing the advertisement.

15. The apparatus of claim 13, said processor to monitor whether the user is actually viewing the advertisement.

16. The apparatus of claim 13, said processor to verify the determination of the level of interest to an advertiser.

17. The apparatus of claim 13, said processor to provide an advertisement displayed on television.

18. The apparatus of claim 13, said processor to identify an advertisement viewed on a web page.

* * * * *